United States Patent Office 3,369,561
Patented Feb. 20, 1968

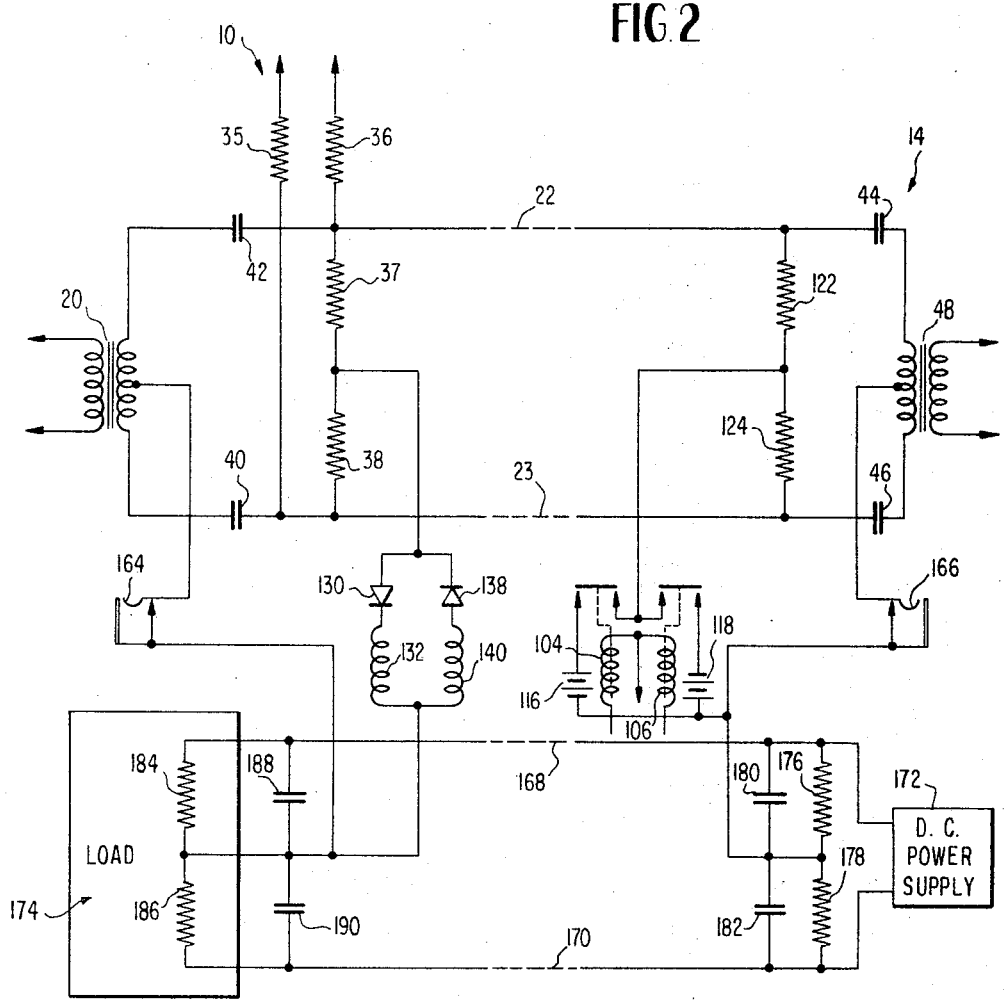

3,369,561
SYSTEM FOR AUTOMATIC REGULATION OF FLOW RATE AND PRESSURE AT A REMOTE LOCATION
Carl W. Zimmerman and Jack R. Hulme, Duncan, Okla., assignors to Halliburton Company, Duncan, Okla., a corporation of Delaware
Filed May 4, 1966, Ser. No. 547,584
16 Claims. (Cl. 137—486)

ABSTRACT OF THE DISCLOSURE

A system for selectively and automatically controlling from a remote location the flow rate and pressure of a fluid flow stream through a pipeline.

---

This invention relates to a system for controlling the physical characteristics of a fluid flow in a pipeline, and more particularly to a system for controlling from a remote location the flow rate and pressure of a fluid flow stream through a pipeline.

In oil well environments, it is often desired to control the amount of fluid being pumped through a pipeline in accordance with varying conditions. For instance, when an oil well is being water flooded in order to stimulate production, large volumes of water are injected into the ground near the oil well in order to force an oil flow from the oil-bearing ground. The amount of water injected into the well must be carefully controlled in order to produce oil at an optimum rate. Further, in such pipeline systems and also in the pumping of oil from a well, it is often desirable to maintain a constant rate of flow of fluid within a selected pressure range through the pipeline for ease of metering and in order to prevent damage to the pump or to the pipeline system.

Additionally, a need often arises for automatically monitoring and controlling the physical characteristics of a plurality of pipeline flow stream locations disposed about a large field. If automatic control of each of these pipeline flow streams is not available, one or more operators will be required to periodically travel around the field in order to measure and manually adjust the flow stream in each pipeline.

Systems have thus been heretofore developed for providing automatic control of one physical characteristic, such as rate of flow, of a pipeline flow stream. Systems have also been previously known which control from a central station the rate of flow of pipeline flow streams at a plurality of remote stations. However, the systems heretofore known have often required continuous manual control from a central station in order to effect control at the remote station. Further, previous remotely controlled pipeline stations have not provided simultaneous automatic remote control of a plurality of physical characteristics of pipeline flow streams.

Accordingly, a general object of the present invention is the provision of a system for automatically controlling the physical characteristics of a pipeline flow stream which substantially eliminates the disadvantages of control systems heretofore available.

A more specific object of this invention is the provision of a control system for automatically controlling the physical characteristics of a pipeline flow stream from a remote location.

Yet another object of the invention is the provision of a control system for pipeline flow streams which automatically controls a plurality of physical characteristics of the flow stream.

A further object is the provision of an automatic pipeline flow stream control system enabling selective control within predetermined magnitude ranges of a plurality of physical characteristics of the flow stream.

Yet a further object of the present invention is the provision of a system for selectively and automatically controlling both the flow rate and pressure of a pipeline flow stream within predetermined magnitude ranges.

A further object of the present invention is the provision of a system for automatically controlling the flow rate of a pipeline flow stream within a predetermined magnitude range and additionally limiting the flow stream pressure to a predetermined high magnitude.

Another object is the provision of a system for automatically controlling the pressure of a pipeline flow stream within a predetermined magnitude range while also limiting the flow stream rate to a predetermined high magnitude.

The instant invention contemplates a system for controlling physical characteristics of a pipeline flow stream comprising at least one remote station disposed adjacent the pipeline flow stream for sensing and controlling at least one physical characteristic of the flow stream, and a central station remotely disposed from the remote station for controlling within a predetermined range of magnitudes the operation of the remote station in accordance with the magnitudes of the physical characteristics sensed by the remote station.

The invention and its many advantages will be further understood by reference to the following detailed description illustrated in the accompanying drawings, in which:

FIGURE 2 is a schematic drawing of another embodiment of a portion of the present invention.

Figure 1:
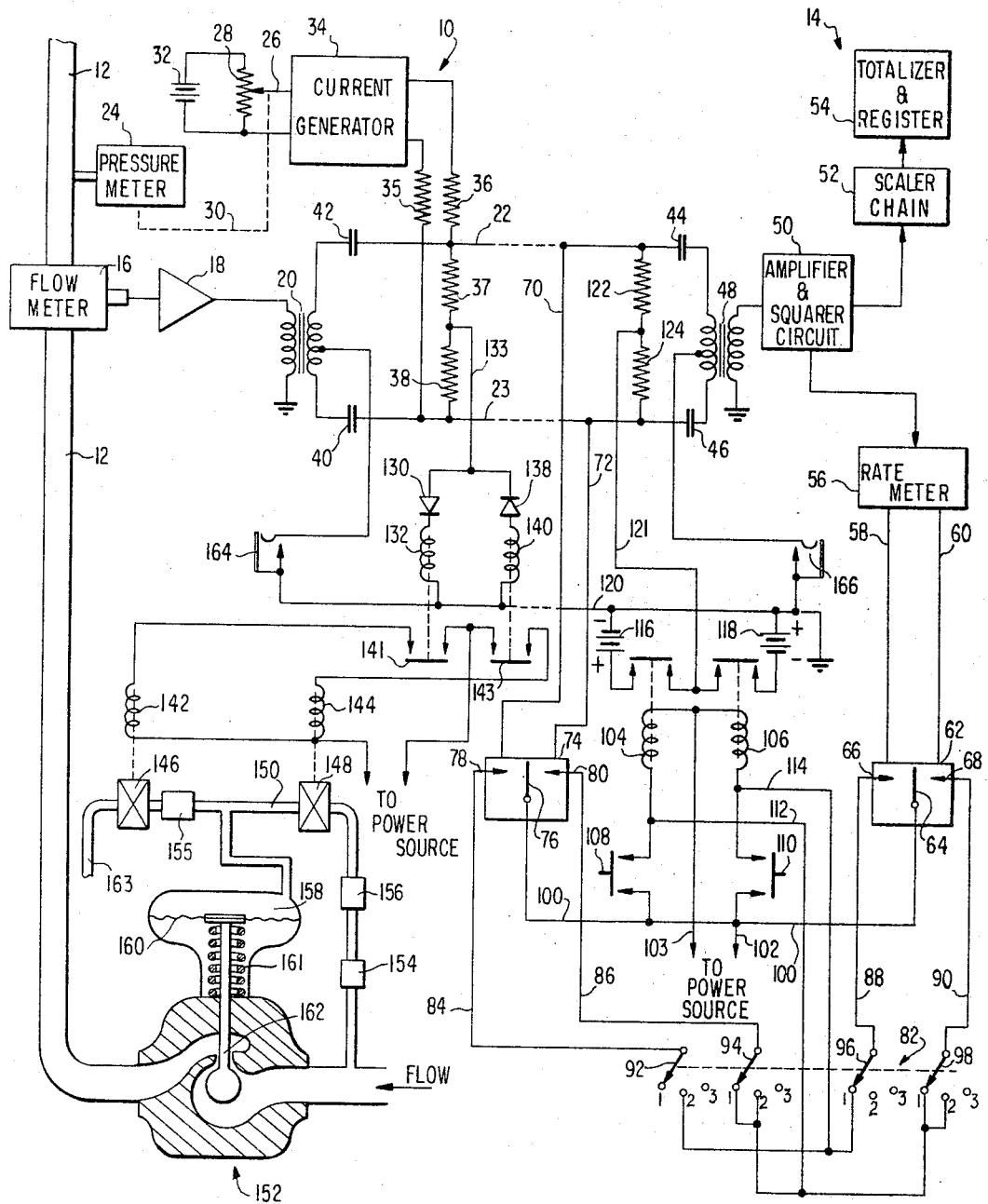
FIGURE 1 is a schematic drawing of one embodiment of the present system.

FIGURE 1 shows a pipeline flow stream control system comprising a remote station 10 disposed next to a pipeline 12 for providing indications of physical characteristics of the pipeline flow stream to a central station 14. It will be understood that the central station 14 may receive indications from a plurality of similar remote stations 10. Each remote station 10 includes a flow meter 16 of a conventional type which provides an alternating electrical signal having a frequency proportional to the rate of flow of fluid passing through the pipeline 12, such as the turbine type flow meter which includes a rotating element producing an electrical pulse upon each complete rotation. The alternating electrical signal provided by the flow meter 16 is amplified by an amplifier 18 and coupled through a transformer 20 to one end of a pair of transmission lines 22 and 23, which may comprise a shielded twisted pair.

Also adjacently disposed next to the pipeline 12 is a pressure transducer 24, which may be of the Bourdon tube type. A change in the pressure of the fluid flow through pipeline 12 causes a corresponding change in the position of the pressure transducer 24, thereby causing movement of the adjustable arm 26 of the potentiometer 28 through a mechanical linkage 30. The position of the arm 26 determines the magnitude of the input voltage applied to a current generator 34, which may be a transistorized amplification circuit balanced at a predetermined voltage level. As the input voltage varies from the level, the generator 34 will provide a D.C. output current having a magnitude directly proportional to the voltage supplied by potentiometer 28, and therefore proportional to the pressure of the pipeline fluid flow.

It should be understood that the current generator 34 might in some instances be eliminated from the present system, and the varying voltage supplied by the potentiometer 26 used directly as a sensing signal. However, the current generator has been found to be particularly advantageous in the present system, as it will provide a predetermined magnitude of current regardless of the length and impedance of the transmission lines 22 and 23. If the current generator is eliminated from the system, the potentiometer 28 would have to be calibrated in accordance with the impedance of the lines 22 and 23.

The output current from current generator 34 is fed through the limiting resistors 35 and 36 to the transmission lines 22 and 23. Resistors 37 and 38 are connected across transmission lines 22 and 23 to form a portion of a circuit somewhat like the so-called "phantom power circuit," wherein a control signal may be transmitted from the central station to the remote station, as will be subsequently described. Capacitors 40 and 42 effectively isolate the direct current signal from the transformer 20, but couple the alternating signal from amplifier 18 to the transmission lines 22 and 23. Thus, the alternating electrical signal from flow meter 16 and the direct current signal from pressure transducer 24 are both transmitted to the central station 14 on transmission lines 22 and 23.

Although the direct current signal is blocked at the central station 14 by capacitors 44 and 46, the alternating electrical signals on lines 22 and 23 are coupled through capacitors 44 and 46 and transformer 48 to the amplification and squaring circuit 50. The squared signal is then fed through the scaler chain 52 to the counting device or equipment 54, where the rate of flow of the fluid stream through pipeline 12 is totalized and visibly registered. The output of the amplification and squaring circuit 50 is also fed to the rate meter 56 which provides a direct current output on leads 58 and 60 having a magnitude directly proportional to the flow rate of the pipeline flow stream.

The direct current output controls the operation of a first relay 62, which may be switched from a normal position to either of two operating positions in response to excursions by the direct current output from a predetermined range of magnitudes. For instance, when the direct current output on leads 58 and 60 drops below a predetermined level, the movable arm 64 of the relay 62 will be switched into connection with contact 66. Similarly, if the signal on leads 58 and 60 rises above a predetermined magnitude, the movable switch arm 64 will be switched into connection with contact 68. The actuation set points of relay 62 are adjustable so that the acceptable range of magnitudes of the direct current output may be selectively changed by the operator in accordance with desired operating conditions of the flow control system.

The direct current signal from the current generator 34 is picked off of transmission lines 22 and 23 by leads 70 and 72 which are connected to a second relay 74. In a similar manner as the first relay 62, relay 74 may be adjusted so that a movable switch arm 76 is switched from a normal inoperative condition to either of two operating positions upon the occurrence of a predetermined level of current on leads 70 and 72. For instance, when the magnitude of the direct current signal drops below a predetermined level, the movable arm 76 will be switched into connection with a contact 78. If the direct current signal on leads 70 and 72 rises above a preset magnitude, the movable switch arm 76 will be switched into connection with contact 80.

It will be understood by one skilled in the art that the relays 62 and 74 may comprise, instead of the adjustable set point relays previously described, two pairs of suitable electronic circuits such as Schmitt trigger circuits. The threshold trigger values of the Schmitt trigger circuits may be made adjustable in order to allow the operator to select the desired range of rate of flow and pressure magnitudes by adjusting each pair of circuits to two different threshold values. Suitable conventional logic circuitry responsive to the output of each pair of Schmitt triggers may be provided to perform subsequent control functions.

The relays 62 and 74 are respectively connected to a gang switch 82 by means of leads 84, 86, 88, and 90. Gang switch 82 comprises switch arms 92, 94, 96, and 98 connected by a suitable mechanical linkage and adapted to be manually operated in order to allow the operator of the central station 14 to selectively choose between three modes of operation. Each of the switch arms has three positions, with each position representing a different mode of operation of the present system.

Additionally, both of the relays 62 and 74 are connected through their respective movable switch arms to a common lead 100, which is connected through lead 102 to one terminal of a suitable A.C. or D.C. power source (not shown). The second terminal of the power source (not shown) is connected to a lead 103 which is also connected to a common terminal of the coils of normally open relays 104 and 106. Manually operated switches 108 and 110 normally provide an open circuit between the first terminal of the power source and the coils of relays 104 and 106. Leads 112 and 114 interconnect the coils of relays 104 and 106 with selected terminals of the gang switch 82 so that energization of the relays may be determined by the position of the gang switch, as will be subsequently described in greater detail.

The respective contacts of relays 104 and 106 are normally open so that the voltage sources or batteries 116 and 118 are normally not connected into the control circuitry. A third signal transmission path 120 extends from the central station 14 to the remote station 10. Unlike terminals of the batteries 116 and 118 are commonly connected to the third signal transmission path 120 and a respective contact of relay 104 or 106. A lead 121 connects one side of each of the contacts of relays 104 and 106 to a common junction of resistors 122 and 124 which are connected across transmission lines 22 and 23. Resistors 122 and 124, together with resistors 37 and 38, constitute a bridge configuration to provide the aforementioned "phantom circuit." These resistors may be adjustable to facilitate balancing of the bridge circuit.

At the remote station 10, the cathode of a unidirectionally conducting diode 130 is connected to a terminal of a relay coil 132, with the anode of the diode 130 being connected at the junction point of resistors 37 and 38 by lead 133 in order to provide a current path to transmission path 120 when battery 116 is connected into the circuit. A second unidirectionally conducting diode 138 is connected to the junction point of resistors 37 and 38 by lead 133 and is also connected in series with a relay coil 140. The diodes 130 and 138 thus define paths for currents of opposite polarities, the current through relay coils 132 and 140 performing switching operations. These four resistors 37, 38, 122, and 124 may be seen to constitute the resistive elements of a bridge circuit, with a substantially non-resistive current path being provided through one of the batteries 116 or 118, the third signal transmission path 120, and one of the diodes 130 or 138 to energize one of the switch operating relay coils 132 or 140. The direction of the current flow will of course depend upon which of the batteries 116 and 118 is connected into the circuitry by the energization of relays 104 or 106.

A normally open relay contact 141 is associated with relay coil 132, and is connected between one terminal of a suitable A.C. or D.C. power source (not shown) and a solenoid valve coil 142. When current flows through coil 132 by virtue of battery 116 being connected into the circuit, relay contact 141 will be closed to supply current from the power source (not shown) through the solenoid valve coil 142. A second normally open relay contact 143 is associated with coil 140 and is connected between the suitable power source (not shown) and a second solenoid valve coil 144. When battery 118 is directly connected between the third transmission path 120 and resistors 122 and 124, current will flow through the unidirectionally conducting diode 138 and relay coil 140, thus closing the normally open contact 143 and energizing the solenoid valve coil 144 from the power source (not shown).

The solenoid valve coils 142 and 144 are connected respectively to normally closed valves 146 and 148 disposed in a small fluid line 150. Line 150 is connected at one end to the pipeline 12 on the upstream side of a valve 152, and includes a suitable filter 154 and chokes 155 and 156 in order to allow the amount of fluid passing through the line 150 to be selectively initially adjusted. Line 150 communicates with a chamber 158 of a conventional pressure sensitive system including diaphragm 160 and a movable, spring biased valve member 162. When valve 148 is opened by energization of coil 144, the pressure in chamber 158 is increased due to an additional flow of fluid from pipeline 12 through line 150. The diaphragm 160 and valve member 162 are thus moved downwardly against the force of the bias spring 161 because of the increase in pressure in order to increase the magnitude of the pipeline fluid flow in the downstream side of the valve 152. Conversely, if valve 146 is opened by the energization of coil 142, fluid in chamber 158 will be discharged through opening 163 of line 150 due to the spring bias on diaphragm 160 and member 162, and the valve member 162 is moved upwardly in order to decrease the flow of pipeline fluid through the downstream side of valve 152.

The amount of fluid allowed to flow through line 150 by chokes 155 and 156 is usually small, so that energization of either of the valves 146 or 148 will cause relatively slow operation of the valve 152. Such an operation will prevent excessive hunting of the system, as the flow rate and pressure responsive circuitry will quickly de-energize the control valves when the fluid flow reaches the normal range of operation. The movable valve member 162 will then be stabilized in the position presently providing the desired fluid flow in the pipeline.

It should be understood that an electrical servomotor could be utilized in place of valve 152, wherein the solenoid valves 146 and 148 would be replaced by suitable electrical contactors. The electrical servomotor operates relatively slowly in a manner similar to the previously described valve 152, in order to prevent excessive hunting of the system. Also in a manner analogous to the valve 152, the operation of the electrical servomotor is stopped when the fluid flow conditions reach the desired range, and the present valve opening for the pipeline is maintained until the next control adjustment is required Alternatively, valve 152 could be actuated by a separate hydraulic system, or by an air system, instead of utilizing a portion of fluid from the pipeline 12.

Intercommunication jacks 164 and 166 are provided in the control system in order to allow audio communication between the remote station 10 and the central station 14. One side of jack 164 is center-tapped to transformer 20, while one terminal jack 166 is center-tapped to transformer 48. The second terminals of the jacks are grounded, as shown at the second terminal of jack 166.

The operation of the present system may be best understood by a description of operation with the gang switch 82 initially in position 1, as illustrated in FIGURE 1. The present system in this mode of operation provides an automatic regulation of the rate of flow of the pipeline fluid stream within a predetermined magnitude range, in addition to regulation of the pressure of the pipeline flow stream below a predetermined high pressure.

For instance, if the rate of flow of fluid in pipeline 12 increases above the high point setting of relay 62, the movable arm 64 of relay 62 will be switched into connection with contact 68. A complete electrical circuit will then exist to allow a current flow through relay 104 from the power source (not shown) through lead 103, relay coil 104, lead 112, switch arm 98, lead 90, movable arm 64, lead 100 and lead 102. The energization of relay coil 104 will cause battery 116 to be connected between the third signal transmission path 120 and the junction point of resistors 122 and 124, thereby inducing current flow through coil 132 and consequently causing relay coil 142 to be energized. The normally closed valve 146 will be opened, reducing the fluid pressure in chamber 158 and thereby decreasing the fluid flow through valve 152.

Similarly, a decrease in the fluid rate of flow which results in an output signal from ratemeter 56 having a magnitude below the predetermined set point of relay 62 will connect the movable arm 64 with contact 66. A completed electrical circuit will thus exist between the power source (not shown) and the relay coil 106 through lead 103, coil 106, lead 114, switch arm 96, lead 88, movable arm 64, lead 100, and lead 102. Energization of the coil 106 will connect battery 118 into the circuitry and induce a current flow through coil 140, thereby subsequently opening valve 148 and causing the fluid pressure in chamber 158 to be increased. The resulting downward deflection of diaphragm 160 will open valve 152 in order to increase the rate of fluid flow through the flow meter 16.

Additionally, with the gang switch 82 in position 1, a high pressure override regulation is provided for pressures having a magnitude above the high preset level of relay 74. Upon the occurrence of such a high pressure, movable arm 76 will be switched into connection with contact 80, thereby completing a circuit between the power source (not shown) and coil 104 through lead 103, coil 104, lead 112, switch arm 94, lead 86, movable arm 76, lead 100, and lead 102. Energization of coil 104 will cause the valve member 162 to restrict the amount of fluid flow through valve 152 in the manner previously described. As the switch contact 92 is open circuited in this mode of operation, no low side control of the pressure in pipeline 12 is provided.

If the gang switch 82 is manually operated to move each of the switch arms into position 2, the present system will be connected in a manner to provide automatic pressure regulation of the pipeline fluid flow within the predetermined pressure range determined by the point settings of relay 74. Additionally downward control of the fluid flow will be effected by the occurrence of a fluid flow rate having a magnitude over the level determined by the set point of relay 62. As one end of lead 88 will be open circuited in the second position of gang switch 82, no low side control of the flow rate is provided by relay 62 in this mode of operation. As the automatic pressure regulation and high rate of flow override of the system will be apparent to one skilled in the art from the previous description of the system operation, additional detailed description of this mode of operation of the circuit is deemed unnecessary.

When the gang switch 82 is switched to position all the switch arms at position 3, both relay 62 and 74 will be switched completely out of the control circuitry. The operator at the central station may then manually control the operation of the valve member 162 by selectively closing switch 108 in order to directly connect coil 104 to the power source. In the manner previously described, the valve 152 will be operated to reduce the amount of fluid flow through the downstream side of pipeline 12. Conversely, the operator may manually close switch 110 in order to increase the amount of fluid flow through pipeline 12 in a manner made obvious from the previous description.

In the embodiment of the invention previously described, the third signal transmission path 120 is preferably a cable shield for the twisted pair 22 and 23. However, it is obvious that an earth ground could be utilized for path 120, wherein the twisted pair 22 and 23 could be unshielded and one terminal of each of the batteries 116 and 118 could be connected directly to the ground. One end of each of the relay coils 132 and 140 would then also be connected directly to ground at the remote location 10.

A variation of the present invention is illustrated in FIGURE 2 wherein electrical power for the remote location 10 may be furnished from the central station 14 over a conventional quad of transmission lines. In FIGURE 2, like numerals are utilized for like components previously described in FIGURE 1, and certain parts of the previous circuitry have been omitted for clarity of description. This embodiment of the circuit utilizes a wire quad comprising transmission lines 22, 23, 168, and 170. Transmission lines 22 and 23 includes the transmission circuit arrangement previously described, whereby indications of both the pressure and the rate of flow of the pipeline 12 may be sent from remote stations 10 to the central station 14. In this embodiment, however, instead of utilizing separate power sources at both the remote station 10 and central station 14 for energization of equipment, power is supplied from the central station 14 to the remote station 10 from the power supply 172.

The power from supply 172 is directed over lines 168 and 170 to the equipment of the remote station 10, shown diagrammatically as load 174. Unlike terminals of each of the batteries 116 and 118 are connected between the junction point of second phantom circuit resistors 176 and 178, with capacitors 180 and 182 being utilized to bypass any alternating current signal from lines 22 and 23. Similar second phantom circuit resistors 184 and 186 are connected across lines 168 and 170 at remote station 10, together with associated bypass capacitors 188 and 190. One terminal of each of the relay coils 132 and 140 is interconnected between the junction point of the resistors 184 and 186 to provide a third signal transmission line by utilization of the phantom circuit principle. Thus, a second resistive bridge comprising resistors 176, 178, 184, and 186 is interconnected with the first bridge previously described. Current flow may exist between the two bridges having a polarity dependent upon which of the batteries 116 or 118 is connected into the circuit. This current flow through either relay coil 132 or 140 is utilized to control the operation of a pipeline valve in the manner previously described.

Although several embodiments of the present invention have been illustrated and described, it will be apparent to those skilled in the art that various changes and modifications can be made without departing from the invention or from the scope of the appended claims.

We claim:
1. A system for controlling a plurality of physical characteristics of a pipeline flow stream comprising:
at least one remote station including first and second transducer means, said first transducer means producing an alternating current electrical signal having a frequency proportional to the magnitude of a first physical characteristic of the pipeline flow stream, said second transducer means producing a direct current signal having a magnitude proportional to the magnitude of a second physical characteristic of the pipeline flow stream;
said remote station including control means for varying the physical characteristics of the pipeline flow stream;
a central station spaced from said remote station;
signal transmission means connecting said remote station and said central station for transmitting said electrical signals from said first and second transducer means to said central station, said central station having circuit means providing control signals to said control means in response to electrical signals from said first and second transducer means.

2. The apparatus of claim 1 wherein said first transducer means comprises a flowmeter responsive to the rate of flow of the pipeline flow stream, and
said second transducer means comprises a pressure transducer responsive to the pressure of the pipeline flow stream.

3. The apparatus of claim 1 wherein said signal transmission means comprises a pair of transmission lines, a first end of said pair of transmission lines being coupled to said remote station for receiving the alternating current electrical signal from said first transducer means for transmission to said central station,
said second transducer means being connected across said pair of transmission lines for providing said direct current signal to said central station through said pair of transmission lines.

4. The apparatus of claim 3 wherein a second end of said pair of transmission lines is coupled to said central station to provide the alternating current electrical signal from said first transducer means,
said central station including means for providing direct current signals having a magnitude proportional to the frequency of said alternating current electrical signals,
said circuit means in said central station being responsive to both of said direct current signals from said first and second transducer means for providing said control signals to said control means for varying said physical characteristics of the pipeline flow stream.

5. The apparatus of claim 4 wherein said signal transmission means includes a third transmission path for carrying in conjunction with said pair of transmission lines said control signals from said circuit means,
said circuit means including first relay means responsive to said direct current signal having a magnitude proportional to the frequency of said alternating current electrical signals, said circuit means further including second relay means connected across said pair of transmission lines and responsive to said direct current signal from said second transducer means,
control signal generating means connected between said third transmission path and said first and second relay means,
said first and second relay means being responsive to predetermined characteristics of said signals from said first and said second transducer means to cause said control signal generating means to transmit said control signals over said third transmission path and said pair of transmission lines.

6. The apparatus of claim 5 comprising
a first pair of resistance means, each of said resistance means being disposed at an opposite end of said pair of transmission lines,
a pair of lead means, each of said lead means being connected at one end to one of said resistance means,
said control signal generating means being connected at said central station by one of said lead means between one of said resistance means and said third transmission path,
a pair of switch operating means for operating said control means connected at said remote station by the other of said lead means between the other of said resistance means and said third transmission path,
said first pair of resistance means and said third transmission path forming a bridge configuration in order to transmit said control signals from said central station to said remote station.

7. The apparatus of claim 6 wherein said pair of switch operating means comprises:
first and second unidirectionally conducting means, said conducting means having unlike terminals connected to said other of said resistance means at said remote station,
first and second relay coil means each connected between one of said unidirectionally conducting means and said third transmission path,
said control signals passing through one of said unidirectionally conducting means and the connected one of said relay coil means to operate said control means.

8. The apparatus of claim 6 wherein said control signal generating means comprises:
first and second voltage sources, said voltage sources having unlike terminals connected to said third transmission path, a pair of normally open relay means interconnected between said first and second relay means and the remaining unlike terminals of said voltage sources, said normally open relay means also being connected at said central station by one of said lead means to one of said resistance means, a selected one of said voltage sources being connected directly between said one of said resistance means and said third transmission path for generating a control signal only upon an excursion of said signals from said first and second transducer means from a predetermined range of characteristic magnitudes.

9. The apparatus of claim 6 wherein said pair of transmission lines comprises:

a twisted pair of transmission line cables, and said third transmission path comprises a shield about said lines.

10. The apparatus of claim 6 wherein said third transmission path comprises an earth return.

11. The apparatus of claim 6 wherein said third transmission path includes interconnected jack means located at both said remote station and said control station for permitting communication between said stations.

12. The apparatus of claim 6 wherein said control means for varying the physical characteristics of the pipeline flow stream comprises adjustable valve means disposed in said pipeline flow stream, first and second solenoid means, said first solenoid means being responsive to a control signal of a predetermined polarity for operating said valve means in one direction in order to obstruct the flow stream, and said second solenoid means being responsive to a cotnrol signal of a second polarity for moving said valve means in a second direction for increasing the magnitude of the flow stream.

13. The apparatus of claim 6 wherein said third transmission path comprises a second pair of transmission lines.

14. The apparatus of claim 13 wherein said second pair of transmission lines includes second resistance means connected across each end of said second pair of transmission lines, a pair of said unlike terminals of said voltage sources being connected to said second resistance means at said central station, said pair of switch operating means being connected between one of said first and second resistance means at said remote station, said first and second resistance means forming a bridge configuration to transmit said control signals, and power means connected at one end of said second pair of transmission lines for supplying direct current power to both said central station and said remote station over said second pair of transmission lines.

15. The apparatus of claim 6 wherein each of said relay means assumes a first switching position in response to a signal having a magnitude greater than a predetermined level and a second switching position in response to a signal having a magnitude less than a predetermined level, and further comprising switch means for selectively disconnecting said second switching position of at least one of said relay means.

16. The apparatus of claim 15 including manual control means for controlling the operation of said control signal generating means, said switch means adapted to selectively disconnect both of said relay means and connect said manual control means to said control signal generating means.

References Cited

UNITED STATES PATENTS

| | | | |
|---|---|---|---|
| 1,879,545 | 9/1932 | Seeley | 137—486 XR |
| 1,942,793 | 1/1934 | Bailey | 137—486 XR |
| 2,072,314 | 3/1937 | Rhodes | 137—486 XR |
| 2,895,502 | 7/1959 | Roper et al. | 137—486 |
| 3,267,958 | 8/1966 | Weisheit | 137—486 |

M. CARY NELSON, *Primary Examiner.*

R. J. MILLER, *Assistant Examiner.*